United States Patent [19]

Paap

[11] Patent Number: 4,580,050
[45] Date of Patent: Apr. 1, 1986

[54] BEHIND CASING WATER FLOW DETECTION

[75] Inventor: Hans J. Paap, Houston, Tex.

[73] Assignee: Texaco Inc., White Plains, N.Y.

[21] Appl. No.: 516,502

[22] Filed: Jul. 25, 1983

[51] Int. Cl.⁴ .............................................. G01V 5/10
[52] U.S. Cl. .................................... 250/270; 250/266
[58] Field of Search ............ 250/270, 266, 265, 356.2, 250/356.1; 376/166

[56] References Cited

U.S. PATENT DOCUMENTS

| | | | |
|---|---|---|---|
| 4,032,778 | 6/1977 | Paap et al. | 376/166 |
| 4,032,780 | 6/1977 | Paap et al. | 376/166 |
| 4,035,640 | 7/1977 | Arnold et al. | 376/166 |
| 4,169,979 | 10/1979 | Arnold et al. | 250/266 |

Primary Examiner—Alfred E. Smith
Assistant Examiner—Constantine Hannaher
Attorney, Agent, or Firm—Robert A. Kulason; Ronald G. Gillespie

[57] ABSTRACT

A method for providing a signal respresentative of undesired water flow behind well casing in a producing well includes locating a well tool sized and adapted for passage through a well bore having a source of high energy neutrons at least some of which have sufficient energy to cause a nuclear reaction $O^{16}$ (n,p) $N^{16}$ and at least three (3) gamma ray detectors spatially arranged in a predetermined manner with said source and each other in a well bore at a depth to be investigated. The environs of the bore hole are irradiated with high energy neutrons from said source. The gamma ray detectors detect gamma rays resulting from the decay of the unstable isotope $N^{16}$ comprising a portion of any undesired behind casing water flow present. Count signals representative of the detection are generated. The count signals are combined according to a first predetermined relationship to derive at least two net count signals for two of the three detectors. The net count signals are combined according to a second predetermined relationship to derive the signal representative of the linear flow of the undesired water flow behind the well casing.

16 Claims, 2 Drawing Figures

BEHIND CASING WATER FLOW DETECTION

BACKGROUND OF THE INVENTION

The present invention relates to well logging methods in general and, more particularly, to radio active well logging methods.

SUMMARY OF THE INVENTION

A method for providing a signal representative of undesired water flow behind well casing in a producing well includes locating a well tool sized and adapted for passage through a well bore having a source of high energy neutrons at least some of which have sufficient energy to cause a nuclear reaction $O^{16}$ (n,p) $N^{16}$ and at least three (3) gamma ray detectors spatially arranged in a predetermined manner with said source and each other in a well bore at a depth to be investigated. The environ of the borehole is irradiated with high energy neutrons from said source. The gamma ray detectors detect gamma rays resulting from the decay of the unstable isotope $N^{16}$ comprising a portion of any undersired behind casing water flow present. Count signals representative of the detection are generated. The count signals are combined according to a first predetermined relationship to derive at least two net count signals for two of the three detectors. The net count signals are combined according to a second predetermined relationship to derive the signal representative of the linear flow of the undesired water flow behind the well casing.

The object and advantages of this invention will appear more fully hereinafter from a consideration of the detailed description which follows taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
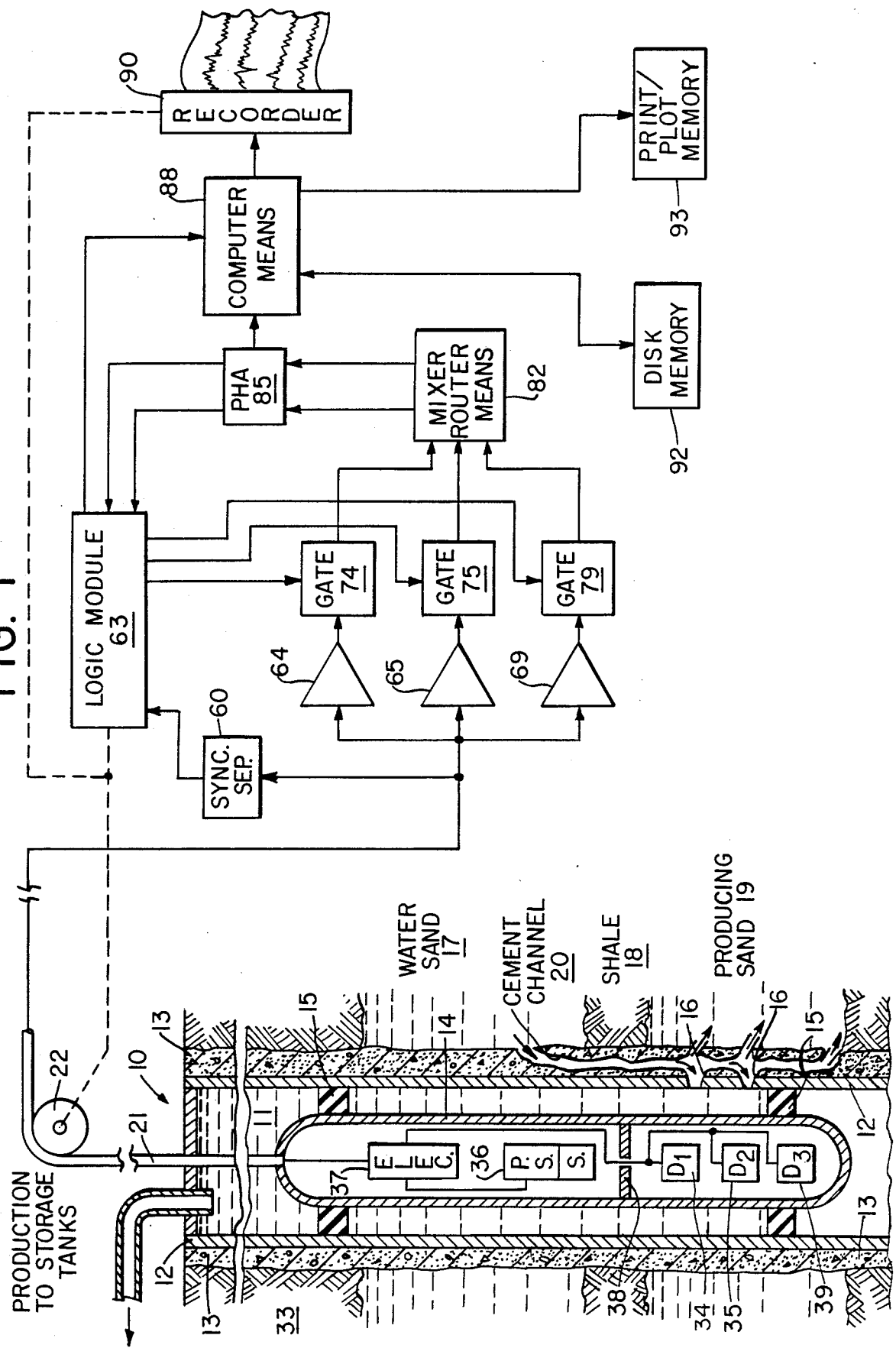
FIG. 1 is a schematic representation of a water flow detection system in a cased well bore according to the present invention.

A conventional Behind Casing Water Flow (BCWF) monitor, such as of the type described and disclosed in U.S. Pat. Nos. 4,032,778; 4,032,780 and 4,035,640, determines the linear flow velocity of water flowing within and/or behind casing from the ratio of the net count rates of two detectors spaced at distances $S_{o1}$ and $S_{o2}$ from the target of a neutron generator. The velocity $v$ of the flowing water is then determined from the folowing equation $$v = \lambda(S_{02} - S_{01})/[\ln(C_1^N/C_2^N) + \ln K] \quad (1)$$

where $C_1^N$ and $C_2^N$ are the net count rates of detector 1 and detector 2, respectively, $\lambda = 9.7215 \times 10^{-2}$ sec$^{-1}$ which is the decay constant of $N^{16}$ and K is constant.

The net count rates $C_1^N$ and $C_2^N$ are determined by subtracting the detector background count rates $C_1^B$ and $C_2^B$ from the measured count rates $C_1$ and $C_2$ of detectors 1 and 2, respectively, as follows.

$$C_1^N = C_1 - C_1^B \quad (2)$$

$$C_2^N = C_2 - C_2^B \quad (3)$$

To obtain the net count rates, the background count rates must be either known or measured. In many instances the background count rates can be measured by using the BCWF tool in such a position that the water flows in the direction from the detector towards the neutron generator or by measuring the background count rates in a section of the well where there is no water flow.

Both techniques are severely affected by instabilities of neutron generator output since background and flow monitoring are made at considerably different times and/or at different locations (formations, etc.) in the well. The former method cannot be used when water behind the casing flows simultaneously and in the opposite direction from that flowing within the casing. Therefore it appears to be of great advantage to eliminate the knowledge and/or measurement of background count rates altogether from the determination of water flow velocities. The present invention uses at least three detectors to avoid using the aforementioned techniques and hence their problems.

The measured count rates $C_1$, $C_2$, $C_3$ for three detectors spaced $S_{01}$, $S_{02}$, $S_{03}$ from the neutron generator target are given by $$C_1 = C_1^N + C_1^B \quad (4)$$

$$C_2 = C_2^N + C_2^B \quad (5)$$

$$C_3 = C_3^N + C_3^B \quad (6)$$

It was determined that the ratio of $C_1^B$ and $C_2^B$ was constant for a variety of multiple casing configurations even though the individual count rates $C_1^B$ and $C_2^B$ varied widely. Therefore it follows that the ensuing relationship is valid for all detector background rates, $$C_j^B = K_{ij}^B \cdot C_i^B \quad (7)$$

where j and i designate the various detectors, and the $K_{ij}^B$ are constants which are predetermined. Substituting equation 7 with i=1 and j=2 and 3 into equations 4, 5 and 6 the following equations 8, 9, and 10, are obtained $$C_1 = C_1^N + C_1^B \quad (8)$$

$$C_2 = C_2^N + K_{12}^B C_1^B \quad (9)$$

$$C_3 = C_3^N + K_{13}^B C_1^B \quad (10)$$

Equation 1 can be rearranged and used to express $C_2^N$ as function of $C_1^N$ and velocity v as follows $$C_2^N = C_1^N \cdot K_{12} \cdot e^{-S_{12}(\lambda/v)} \quad (11)$$

where $S_{12} = S_{02} - S_{01}$ which is the differential spacing of detectors 1 and 2, and $K_{12}$ is a constant. An equation similar to equation 11 can be written for $C_3^N$ and $C_2^N$ as follows $$C_3^N = C_2^N \cdot K_{23} \cdot e^{-S_{23}(\lambda/v)} \quad (12)$$

where $S_{23}=S_{03}-S_{02}$, which is the differential spacing of detectors 2 and 3, and $K_{23}$ is a constant. Substituting equation 11 into equation 9 and equation 12 into equation 10 we obtain two pairs of equations $$C_1 = C_1^N + C_1^B \quad (13)$$

$$C_2 = C_1^N \cdot K_{12} \cdot e^{-S_{12}(\lambda/v)} + K_{12}^B \cdot C_1^B \quad (14)$$

and $$C_2 = C_2^N + K_{12}^B C_1^B \quad (15)$$

$$C_3 = C_2^N K_{23} e^{-S_{23}(\lambda/v)} + K_{13}^B C_1^B \quad (16)$$

Equations 13 and 14 can now be solved for $C_1^N$ and equations 15 and 16 for $C_2^N$ $$C_1^N = [K_{12}^B C_1 - C_2]/[K_{12}^B - K_{12} e^{-S_{12}(\lambda/v)}] \quad (17)$$

$$C_2^N = [K_{13}^B C_2 - K_{12}^B C_3]/[K_{13}^B - K_{12}^B \cdot K_{23} e^{-S_{23}(\lambda/v)}] \quad (18)$$

Equations 17 and 18 contain now only the known and predetermined constants $K_{ij}^B$ and $K_{ij}$, the measured count rates $C_j$, the known differential spacing, $S_{ij}$ and unknown water flow velocity v. The background count rates have been eliminated. Combining equations 11, 17 and 18 and rearranging the terms, we obtain the implicit function $F(x)=0$ with $x=1/v$.

$$F(x) = 0 = \frac{1}{K_{12}} \cdot e^{S_{12}(\lambda x)} - \frac{[K_{12}^B C_1 - C_2] \cdot [K_{13}^B - K_{12}^B \cdot K_{23} \cdot e^{-S_{23}(\lambda x)}]}{[K_{13}^B C_2 - K_{12}^B C_3] \cdot [K_{12}^B - K_{12} \cdot e^{-S_{12}(\lambda x)}]} \quad (19)$$

Equation 19 can be iteratively solved for $x=1/v$ by the method of Newton of successive interpolations. The algorithm to obtain successive approximations $X_r$ to the true value X is as follows $$X_r = X_{r-1} - \frac{F(X_{r-1})}{\frac{d}{dx} F(X_{r-1})}$$

$$r = 1, 2, \ldots n$$

This technique requires that a first assumption for $X=X_o$ be supplied. When $F(X_r)$ suffices the inequality $$0 \leq F(X_r) \leq \delta$$

where $\delta$ is a very small number, the value $X_r$ is assumed to be a good approximation to the true value of $X=1/v$.

Referring now to FIG. 1, a well logging system in accordance with the concepts of the present invention is shown in a borehole environment with the surface equipment portion thereof and is illustrated schematically. A downhole sonde 14 is suspended in a well borehole 10 by an armored well logging cable 21 and is centralized by centralizers 15 with respect to the interior of the well casing 12. The cased borehole is filled with a well fluid 11. The downhole sonde 14 is provided with three gamma ray detectors 34, 35 and 39 which are shown mounted for detecting water flow in a downward direction behind the casing 12. The arrangement for detecting water in an upward direction behind casing 12 would have detectors above the neutron source as shown in the aforementioned U.S. Pat. No. 4,032,778 for such water flow. The downhole sonde 14 is also provided with a 125 KV power supply and neutron generator 36 of the type providing neutrons having an energy in excess of approximately 10 MeV. Bombardment of the stream of water flowing behind the casing with high energy neutrons causes nuclear interactions to produce the unstable nitrogen isotope 16 from the oxygen nuclei comprising the water molecules in the flowing stream, the nuclear reaction being $O^{16}(n,p)N^{16}$.

Earth formations 33, 17, 18 and 19 are penetrated by the borehole 10. A cement channel 20 on one side of the cement sheath 13 of the cased well bore is illustrated allowing undesired fluid flow in a downward direction from a water sand 17 which contaminates a producing sand 19 separated from the water sand 17 by a shale layer 18. With the well logging instrument 14 placed in the position shown and with the detector source configuration illustrated in FIG. 1, the instrument 14 is capable of detecting undesired water flow from the water sand 17 through the cement channel 12 into the producing sand 19. Perforations 16 in the casing 12 allow fluid from the producing sand to enter to well borehole 10 as well as allowing the undesired water flow down the cement channel 20 to enter the borehole 10. In the configuration shown in FIG. 1, high energy neutrons from the neutron source 36 penetrate the steel casing 12 and activate the elemental oxygen, as noted before, in the water flow from water sand 17 through cement channel 20. The water flowing in channel 20 then continues past detectors 34, 35 and 39 sometime later and gamma rays resulting from the decay of the radioactive nitrogen 16 are detected in the manner previously described by the detectors 34, 35 and 39. Electrical pulses whose height is proportional to the energy of the impending gamma rays detected by the detectors 34, 35 and 39 are transmitted to the electronic section 37 of the downhole instrument which includes multiplexing means for multiplexing the signals from the detectors, and from there are coupled to the well logging cable 21 conductors and transmitted to the surface in a form which will be described in more detail subsequently.

Figure 2:
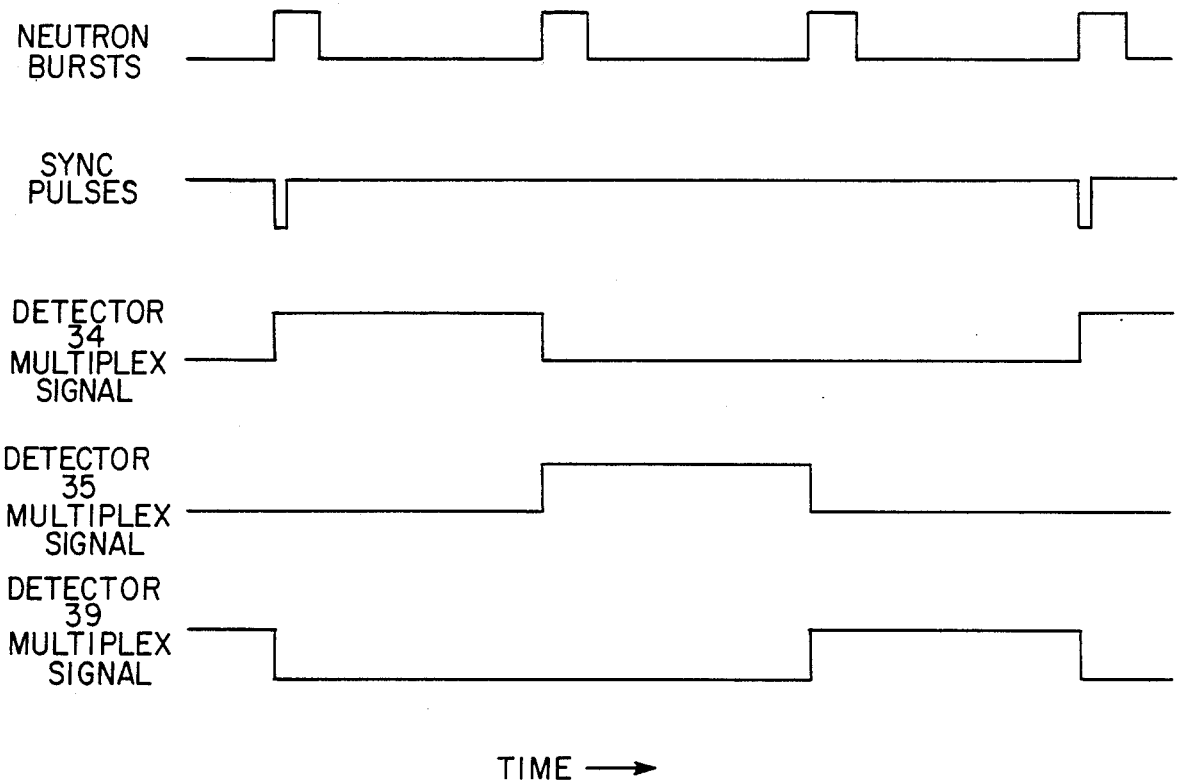
FIG. 2 is a timing diagram of the neutron burst and voltage wave forms occuring in a well logging sonde shown in FIG. 1.

Referring now to FIG. 2, a timing chart for the neutron burst, the sync pulse and downhole detectors 34, 35 and 39 is shown. It will be observed that a neutron burst, generally for a duration of one millisecond, is initiated. Simultaneously with the initiation of the neutron burst in the downhole ihstrument, a large amplitude negative polarity synchronization (or sync) pulse is generated by the electronic section 37 of the downhole instrument and coupled to the conductors of well logging cable 21. The amplitude of the sync pulse is made greater than any possible data pulse amplitude from the detectors.

As can be seen FIG. 2, the signals provided by detector 34 multiplex signal, causes the data pulses provided by detector 34 to be applied to cable 21. Similarly the multiplexing signals for detectors 35 and 39 when at a high logic level causes the pulses provided by detectors 35 and 39 to be provided to logging cable 21. The signals are conducted uphole where a sync separator 60 separates the negative sync pulse and provides it to a conventional type logic module 63. Logic module 63 has internal logic elements and clocks providing the appropriate signals and timing pulses necessary in the operation of the surface equipment. The data pulses from detectors 34, 35 and 37 are applied to amplifiers 64, 65 and 69. Since the gain requirement differs according to the detector, amplifier 64 has a gain associated with detector 34; amplifier 65 has a gain associated with detector 35 and amplifier 69 has a gain associated with detector 39. The gains of amplifiers 64, 65 and 69 are adjustable. The amplified signals from amplifiers 64, 65 and 69 are provided to linear gates 74, 75 and 79, respectively.

Logic module 63 in accordance with the sync pulse from sync separator 60 provides multiplexing signals to control gates 74, 75 and 79 so that they pass data pulses associated with detectors 34, 35 and 39, respectively to mixer router means 82. Mixer router means 82 provides the spectra information and the routing information to pulse height analyzer 85 so that all of the data pulses associated with a particular detector are entered into a different memory section of pulse height analyzer 85.

Pulse height analyzer 85 provides signals representative of the count rates to logic module 63 and to computer means 88 which may be a general purpose computer of the type manufactured by Hewlett-Packard as their part 9826. Logic module 63 also provides an output to computer means 88. Computer means 88 will then solve equation 19 in an iterative manner to determine the velocity of water flow. Computer means 88 provides analog signals to strip chart recorder 90 which is also receiving depth information from sheave wheel 22. Computer means 88 also receives and provides digital signals to disc memories 92 and digital signals to print/plot means 93.

What is claimed is:

1. A method for providing a signal representative of the linear flow rate of undesired water flow behind well casing in a producing well, comprising the steps of:
   (a) locating a well tool sized and adapted for passage through a well bore and having a source of high energy neutrons at least some of which have sufficient energy to cause the nuclear reaction $O^{16}$ (n,p) $N^{16}$ and at least three gamma ray detectors spatially arranged in a predetermined manner with said source and each other in a well bore at a depth to be investigated;
   (b) irradiating the borehole environs with high energy neutrons from said source;
   (c) detecting at said detectors gamma rays resulting from the decay of the unstable isotope $N^{16}$ comprising a portion of any undesired behind casing water flow present and generating count signals representative thereof; and
   (d) combining said count signals according to predetermined relationships to derive the signal representative of the linear flow velocity of undesired water flow behind the well casing.

2. The method of claim 1 and further including the steps of:
   removing the well tool from the borehole after the measurements are made at said location;
   reversing the juxtaposition of said source and said detectors;
   relocating said tool at said location with said detectors juxtaposition reversed; and repeating steps (b), (c) and (d).

3. The method of claim 1 wherein the steps are performed while moving said well tool at a known rate past the location to be investigated.

4. The method of claim 2 wherein the steps are performed while moving said well tool at a known rate past the location to be investigated.

5. A method of measuring the linear flow rate of undesired water flow behind well casing in a producing well, comprising the steps of:
   (a) locating a well tool sized and adapted for passage through a well bore and having a pulsed source of approximately 14 MeV neutrons and at least three gamma ray detectors longitudinally spaced from said source and each other in a well bore at a depth to be investigated;
   (b) repetitively irradiating the borehole environs with bursts of fast neutrons from said source;
   (c) detecting at said detectors gamma rays resulting from the decay of the unstable isotope $N^{16}$ comprising a portion of any undesired behind casing flow present and generating count signals representative thereof; and
   (d) combining said count signals according to predetermined relationships to derive an indication of the linear flow rate of undesired behind casing water flow in a preferred direction.

6. The method of claim 5 and further including the steps of:
   removing the well tool from the borehole after the measurements are made at said location;
   reversing the juxtaposition of said source and said detectors;
   relocating said tool at said location with said detectors juxtaposition reversed; and repeating steps (b), (c) and (d).

7. The method of claim 5 wherein the steps are performed while moving said well tool at a known rate past the location to be investigated.

8. The method of claim 6 wherein the steps are performed while moving said well tool at a known rate past the location to be investigated.

9. A method for locating and determining the linear flow rate and direction of undesired water migration behind casing in a cased well borehole producing well fluid through casing perforations, comprising the steps of:
   (a) locating a well tool having a pulsed source of high energy neutrons having sufficient energy to cause the nuclear reaction $O^{16}$ (n,p) $N^{16}$ and at least three gamma ray detectors longitudinally spaced from said source and each other to a position adjacent about or below the perforations;
   (b) repetitively irradiating the borehole environs with bursts of high energy neutrons from said source;
   (c) detecting, substantially in the time between said bursts of neutrons, gamma rays primarily caused by the decay of the unstable isotope nitrogen 16 and generating at least three count signals representative thereof; and
   (d) combining said count signals according to predetermined relationships to derive the signal representative of the linear flow rate of undesired water flow behind the well casing.

10. The method of claim 9 and further including the steps of:
    removing said tool from the borehole after making the first measurement sequence adjacent above or below the perforations;
    reversing the juxtaposition of said source and said detectors;
    locating said tool in the opposite sense below or above the perforations; and
    repeating steps (b), (c) and (d) with said tool in the new location.

11. The method of claim 10 wherein the detecting step is performed by detecting gamma rays only in a preselected energy range in the gamma ray energy spectrum corresponding to the decay of $N^{16}$.

12. The method of claim 11 wherein said preselected energy range extends from approximately 3.25 MeV to approximately 7.20 MeV.

13. The method of claim 10 wherein said neutron bursts are of approximately 1 millisecond duration and are repeated approximately 100 times per second.

14. The method of claim 13 wherein the detecting step commences approximately 3 milliseconds after the cessation of each neutron burst.

15. The method of claim 9 wherein the detecting step is performed by detecting gamma rays only in a preselected energy range in the gamma ray energy spectrum corresponding to the decay of $N^{16}$.

16. The method of claim 15 wherein said preselected energy range extends from approximately 3.25 MeV to approximately 7.20 MeV.

* * * * *